(12) United States Patent
Nothum, Jr.

(10) Patent No.: US 10,889,444 B2
(45) Date of Patent: Jan. 12, 2021

(54) WORK-SAVING IMPROVEMENTS FOR FOOD-PROCESS LINES

(71) Applicant: Robert G. Nothum, Jr., Willard, MO (US)

(72) Inventor: Robert G. Nothum, Jr., Willard, MO (US)

(*) Notice: Subject to any disclaimer, the term of this patent is extended or adjusted under 35 U.S.C. 154(b) by 376 days.

(21) Appl. No.: 15/940,003

(22) Filed: Mar. 29, 2018

(65) Prior Publication Data

US 2018/0282068 A1    Oct. 4, 2018

Related U.S. Application Data

(60) Provisional application No. 62/478,822, filed on Mar. 30, 2017, provisional application No. 62/545,634, (Continued)

(51) Int. Cl.
| | |
|---|---|
| *B65G 15/22* | (2006.01) |
| *B65G 21/14* | (2006.01) |
| *A23P 20/12* | (2016.01) |
| *B65G 15/60* | (2006.01) |
| *B65G 41/00* | (2006.01) |
| *B65G 21/08* | (2006.01) |

(Continued)

(52) U.S. Cl.
CPC .............. *B65G 15/22* (2013.01); *A23P 20/12* (2016.08); *B65G 15/60* (2013.01); *B65G 21/14* (2013.01); *B65G 41/005* (2013.01); *A47J 37/1276* (2013.01); *B65G 21/08* (2013.01); *B65G 41/02* (2013.01); *B65G 2201/0202* (2013.01)

(58) Field of Classification Search
CPC ...... B65G 15/22; B65G 21/14; B65G 41/005; B65G 15/60; B65G 41/02; B65G 21/08; B65G 2201/0202; A23P 20/12; A47J 37/1276
USPC .......................................................... 99/404
See application file for complete search history.

(56) References Cited

U.S. PATENT DOCUMENTS

| | | | |
|---|---|---|---|
| 4,132,156 A | 1/1979 | Glaze, Jr. | ............... B31B 50/00 493/136 |
| 4,852,475 A * | 8/1989 | Yang | ................. A47J 37/1214 99/404 |

(Continued)

FOREIGN PATENT DOCUMENTS

| | | | | |
|---|---|---|---|---|
| DE | 10 2004 062 137 | | 2/2006 | ............. A23G 3/20 |
| DE | 20 2009 016 645 | | 5/2011 | ............ B65G 47/08 |

(Continued)

OTHER PUBLICATIONS

NL Search Report, Appln. No. NL 2020691 dated Jan. 15, 2019.

*Primary Examiner* — Sarang Afzali
*Assistant Examiner* — Darrell C Ford
(74) *Attorney, Agent, or Firm* — Jonathan A. Bay

(57) ABSTRACT

Work-saving improvements for food-process lines include (1) mounting alternate machines of a food process line on pivot hardware to speed up washing and maintenance operations, (2) mounting the machines on rolling riding gear in order to speed up the activities of building and re-building food process lines of a different series of machines, or (3) isolate the food process line in its own tunnel and hence its own climate-controlled atmosphere to reduce conflicts with running two food process lines side by side where one food process line is a source of air borne allergens.

15 Claims, 20 Drawing Sheets

Related U.S. Application Data filed on Aug. 15, 2017, provisional application No. 62/560,392, filed on Sep. 19, 2017, provisional application No. 62/577,375, filed on Oct. 26, 2017, provisional application No. 62/648,613, filed on Mar. 27, 2018.

(51) Int. Cl.
*B65G 41/02* (2006.01)
*A47J 37/12* (2006.01)

(56) References Cited

U.S. PATENT DOCUMENTS

| | | | | |
|---|---|---|---|---|
| 5,172,636 | A | 12/1992 | Theurer | E01B 27/10 |
| | | | | 104/2 |
| 5,846,046 | A | 12/1998 | Warburton | A01D 90/08 |
| | | | | 414/552 |
| 6,902,089 | B2 * | 6/2005 | Carnevali | B60R 7/14 |
| | | | | 224/401 |
| 8,651,015 | B2 * | 2/2014 | Zhu | A23L 3/32 |
| | | | | 422/22 |
| 2002/0015635 | A1 * | 2/2002 | Sinn | B65G 41/008 |
| | | | | 414/346 |
| 2004/0123566 | A1 * | 7/2004 | Limousin | B65B 53/063 |
| | | | | 53/442 |
| 2009/0294246 | A1 | 12/2009 | Pogue | B65G 17/28 |
| 2011/0311685 | A1 | 12/2011 | Hogan et al. | A23C 19/00 |
| 2012/0070553 | A1 | 3/2012 | Hockett et al. | A47J 37/12 |
| 2015/0239591 | A1 | 8/2015 | Bialy | B65G 37/00 |
| | | | | 53/517 |
| 2016/0167888 | A1 | 6/2016 | Messina | B65G 41/00 |

FOREIGN PATENT DOCUMENTS

| | | | |
|---|---|---|---|
| EP | 1 127 496 | 2/2000 | A23L 1/31 |
| EP | 2 481 295 | 8/2012 | A23L 1/00 |

\* cited by examiner

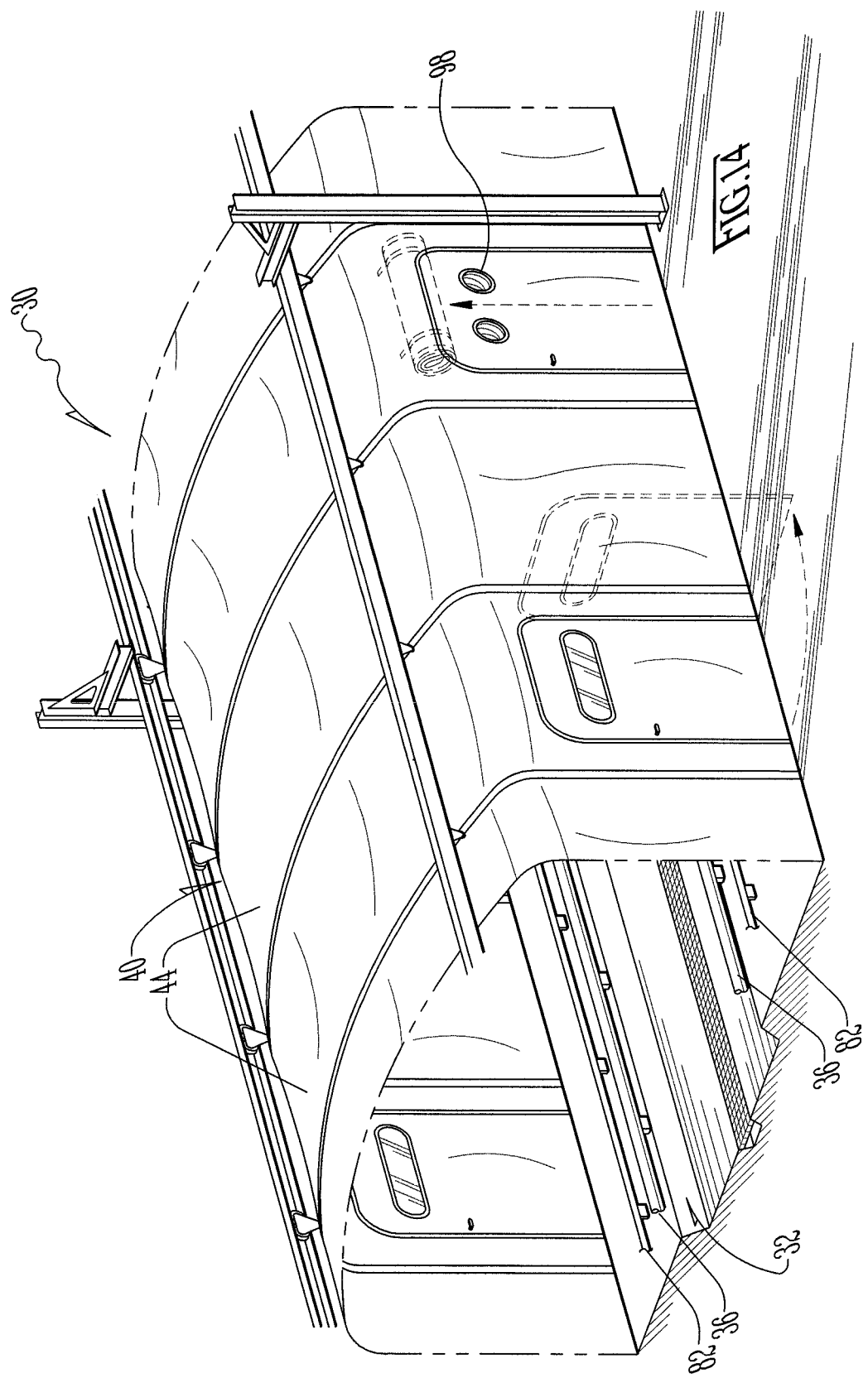

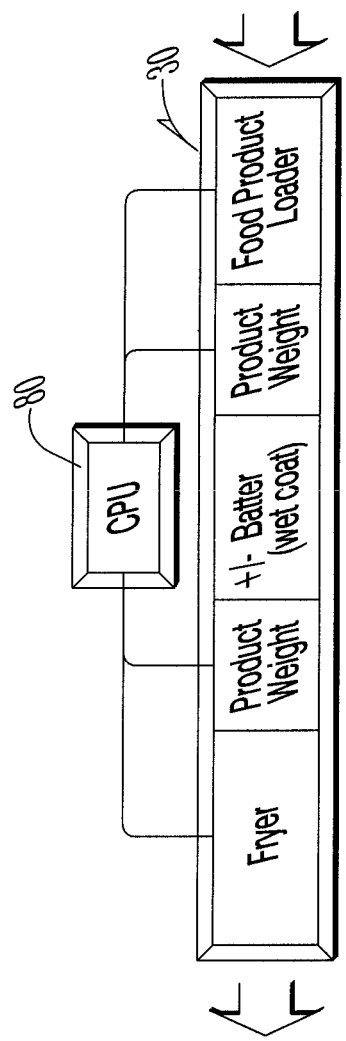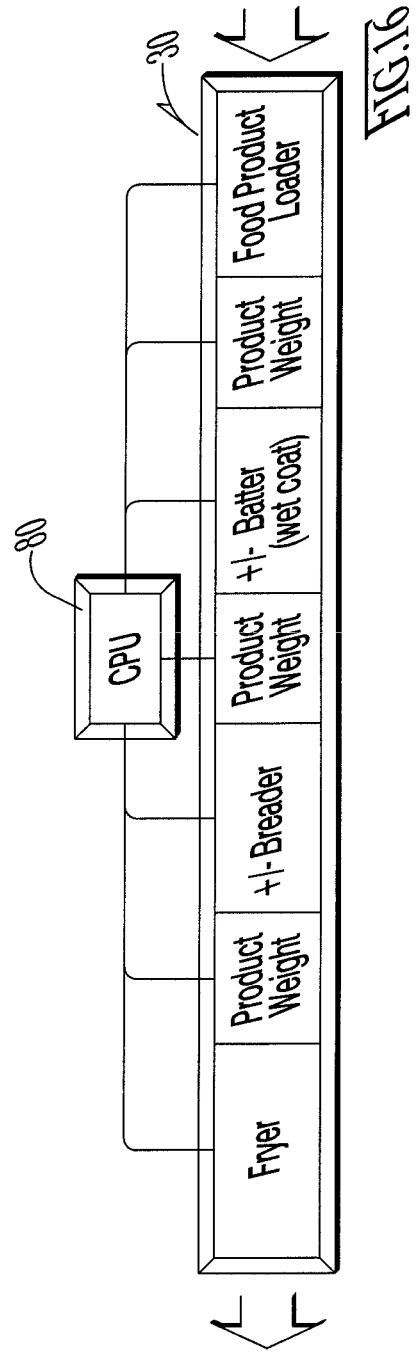

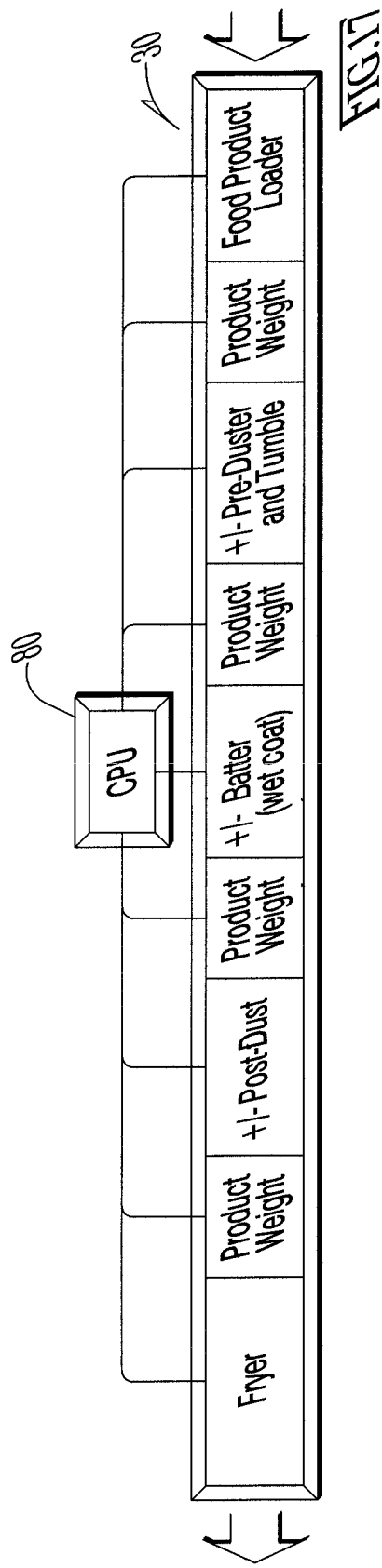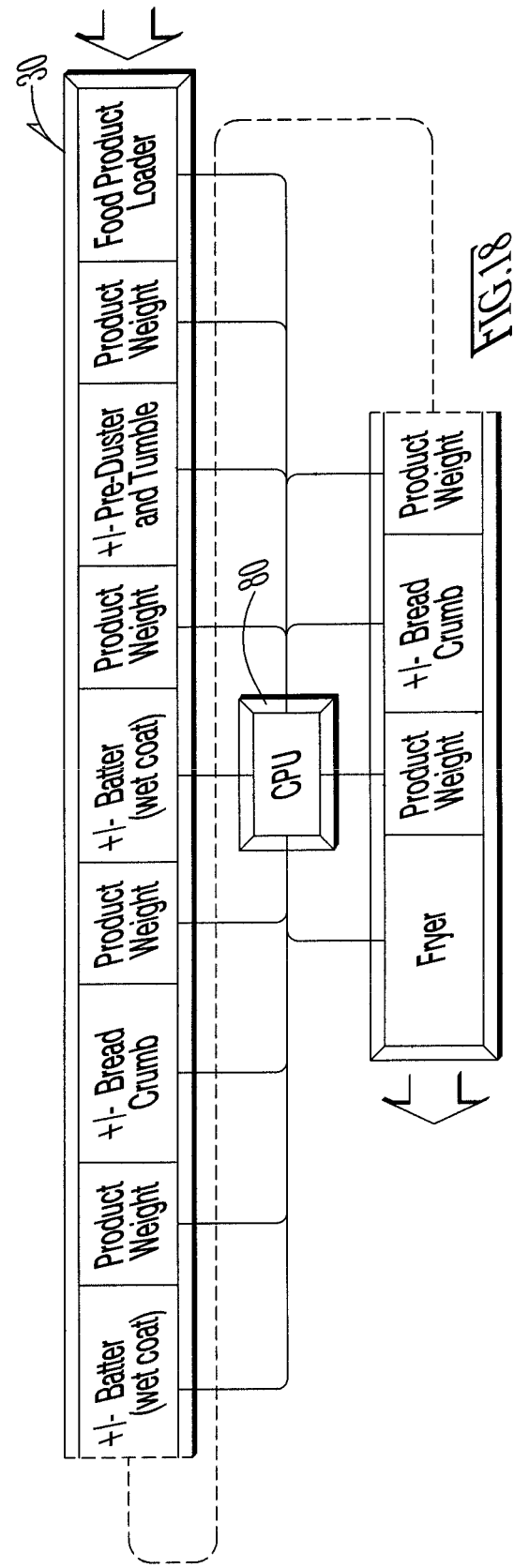
FIG.17
FIG.18

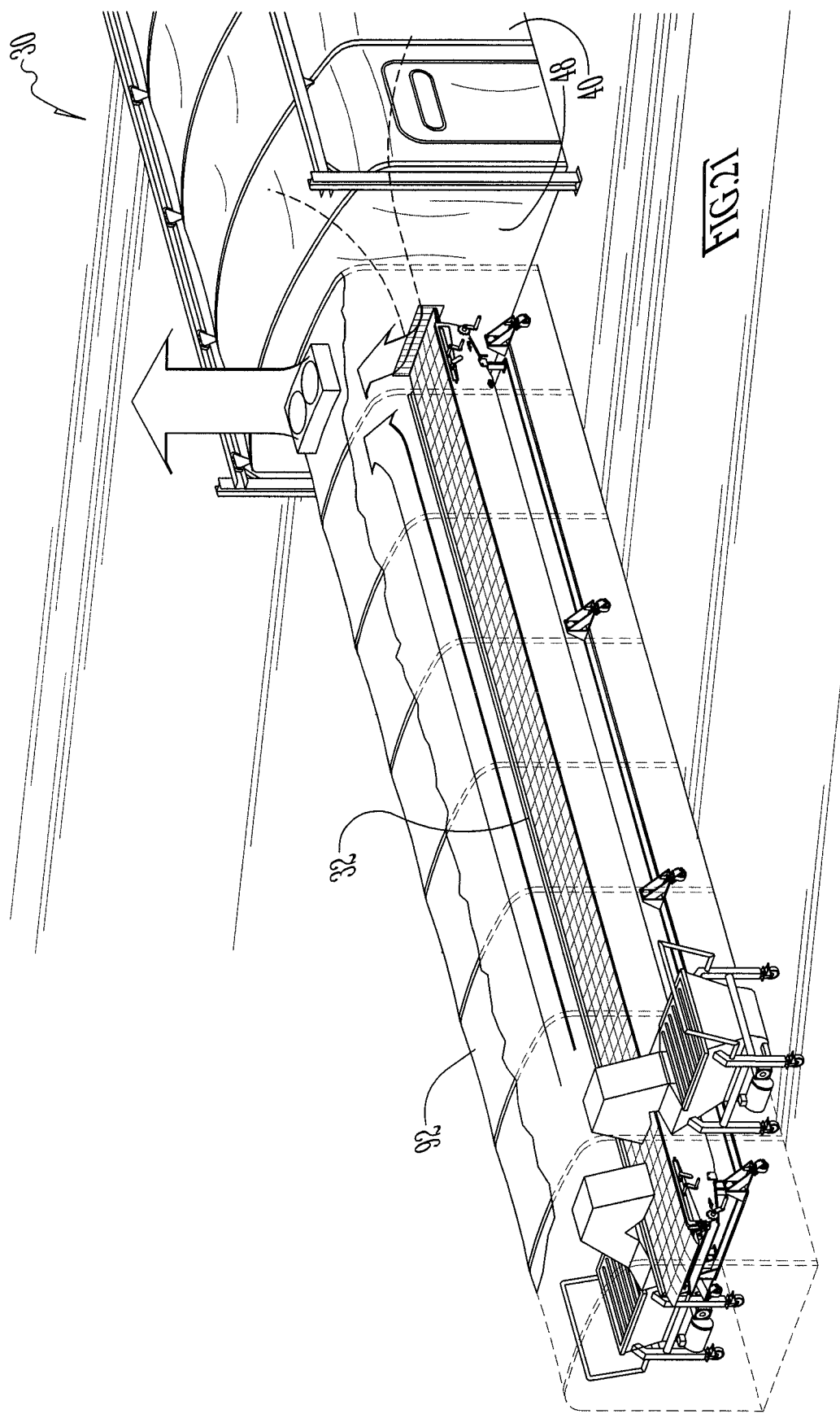

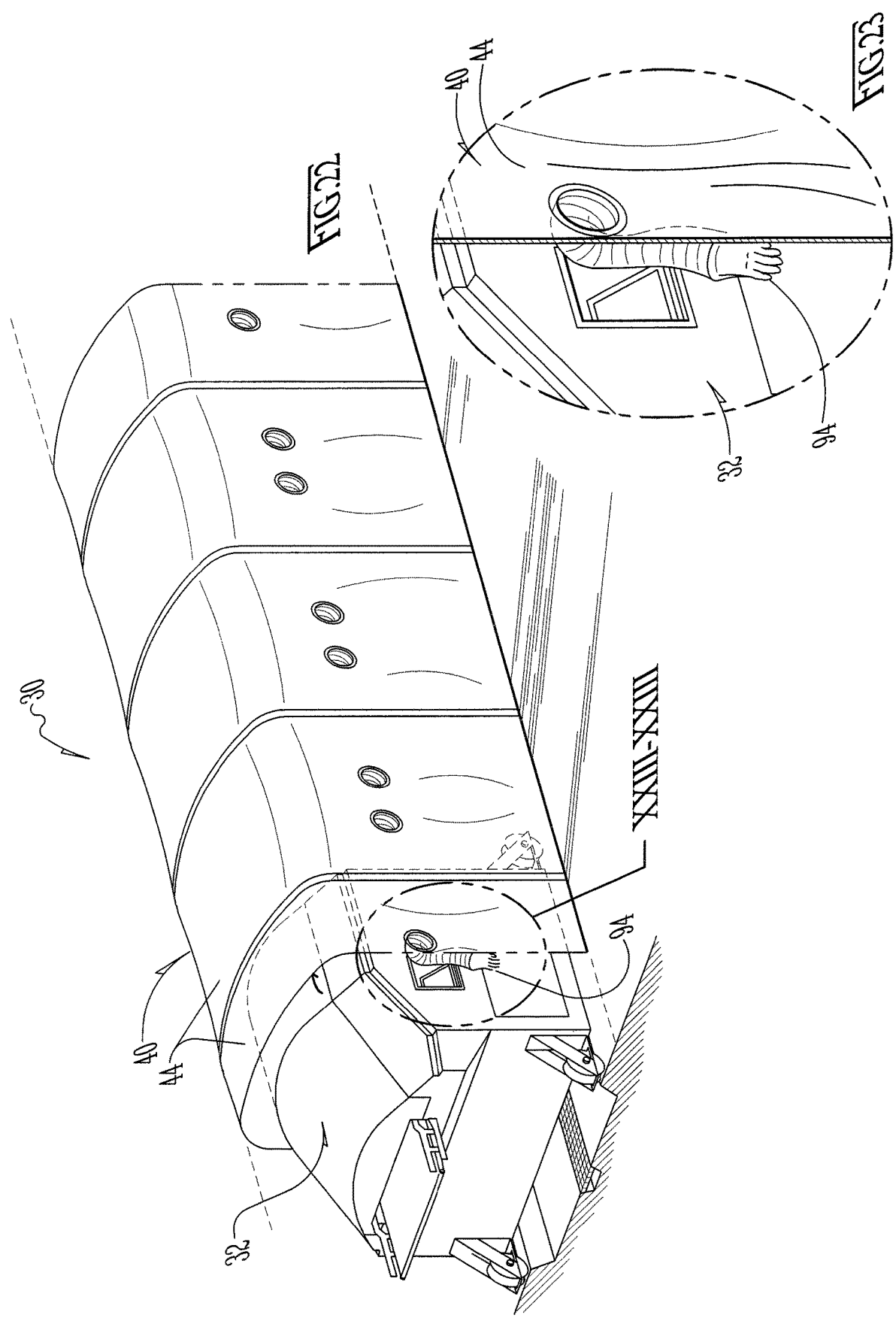

WORK-SAVING IMPROVEMENTS FOR FOOD-PROCESS LINES

CROSS-REFERENCE TO U.S. PROVISIONAL APPLICATION(S)

This application claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018. The foregoing patent disclosures are incorporated herein by this reference thereto.

BACKGROUND AND SUMMARY OF THE INVENTION

The invention generally relates to mechanized and/or automatic food-process line equipment and, more particularly, the invention relates to work-saving improvements for food-process lines include (1) mounting alternate machines of a food process line on pivot hardware to speed up washing and maintenance operations, (2) mounting the machines on rolling riding gear in order to speed up the activities of building and re-building food process lines of a different series of machines, or (3) isolate the food process line in its own tunnel and hence its own climate-controlled atmosphere to reduce conflicts with running two food process lines side by side where one food process line is a source of air borne allergens.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 14 is a perspective view of FIGS. 5;

FIG. 15 is top plan block diagram view of a given food process line in accordance with the invention and showing a feedback control system in accordance with the invention receiving inputs of product weight at one or more positions along the line and outputting control signals to one or more coating machines along the line to raise or lower the applied coating-material weight to the food product undergoing coating processes along the line;

FIG. 16 is a top plan block diagram view comparable to FIG. 15 except showing the feedback control system in accordance with the invention servicing a different assemblage of machines composing this FIG. 16 food process line;

FIG. 17 is a top plan block diagram view comparable to FIGS. 15 and 16 except showing the feedback control system in accordance with the invention servicing a different assemblage of machines composing this FIG. 17 food process line;

FIG. 18 is a top plan block diagram view comparable to FIGS. 15-17 except showing the feedback control system in accordance with the invention servicing a different assemblage of machines composing this FIG. 18 food process line;

FIG. 21 is an enlarged-scale perspective view of detail XXI-XXI indicated in FIG. 20;

FIG. 22 is a perspective view comparable to FIG. 1 except showing individual ones of the side panels of the tunnel equipped with isolation gloves; and FIG. 23 is an enlarged-scale perspective view of detail XXIII-XXIII indicated in FIG. 22.

DETAILED DESCRIPTION OF THE PREFERRED EMBODIMENTS

Figure 1:
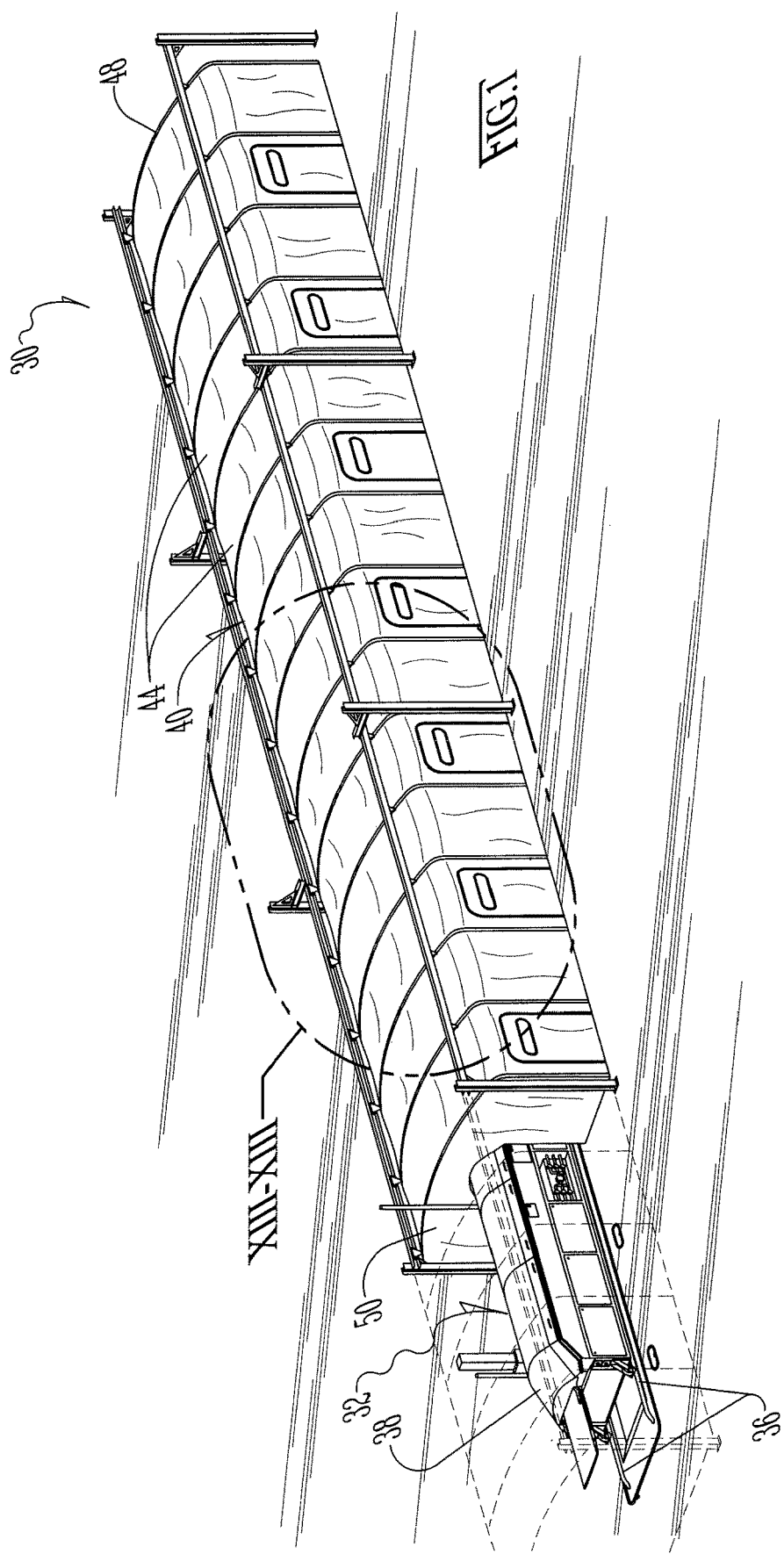
FIG. 1 is a perspective view of an assemblage of food-process line equipment in accordance with the invention wherein each individual machine is preferably mounted on rolling riding gear, and preferably the whole assemblage is riding on a set of parallel tracks, something like small gauge railroad tracks, and housed in an elongated enclosure (eg., tunnel) to isolate a compact environment for independent environmental control of the environment surrounding the food process line within a larger environment such as a commercial food processing plant operating a plurality of food process lines simultaneously.

FIGS. 1-4 show an assemblage 30 of food-process line equipment 32 (which according to context, includes transfer conveyor 56) in accordance with the invention. Each individual machine 32 (which in general, the transfer conveyor 56 is a specific example of the machines 32 in general, and see FIGS. 7 and 8 and the discussion connected therewith) is preferably mounted on rolling riding gear 34. Preferably the whole assemblage 30 is riding on a set of parallel tracks 36, something like small gauge railroad tracks 36. However, the last machine on the left in these views is a fryer 38. It is substantially heavier and has more supply line connections that the other machines. It might be preferable to not roll it onto to tracks 36.

Figure 12:
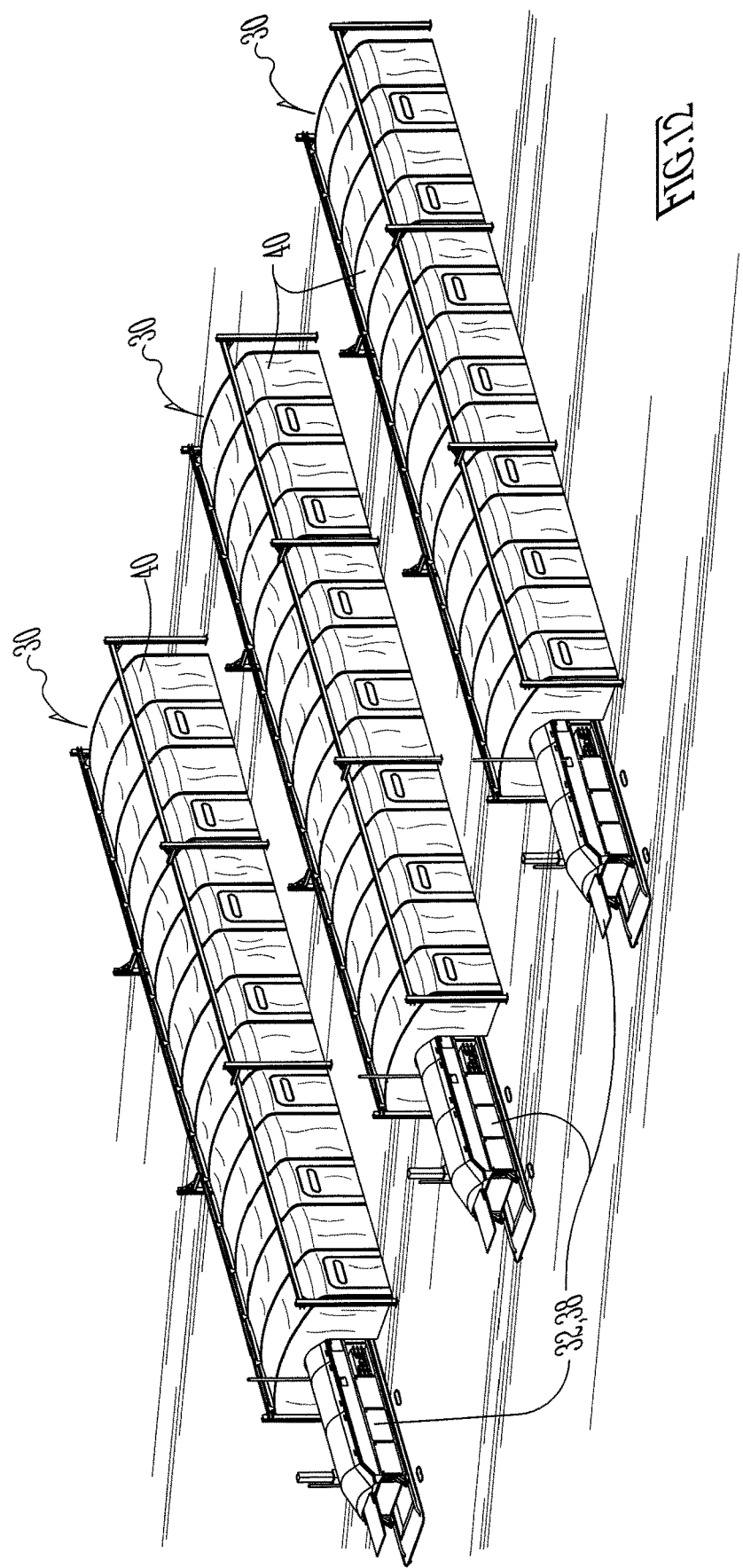
FIG. 12 is a perspective view showing that a single macro-environment (eg., commercial food processing plant, or, factory) can host multiple, enclosed food process lines in accordance with the invention.

The food process line 30 is substantially housed in an elongated enclosure (eg., tunnel 40). The tunnel 40 isolates a compact environment for independent environmental control of the environment surrounding the food process line 30 within a larger environment. The larger environment might be a commercial food processing plant operating a plurality of food process lines 30 simultaneously (see, eg., FIG. 12).

One food process line 30 might be utilizing an ingredient that might be considered an allergen to some people in the public. In order to contain the allergen from wafting over to other food process lines 30 and contaminating them, the food process lines 30 are enclosed and comparatively sealed.

The fryer 38 is left mostly exposed for the most part because of the heat it generates. It might not be good for the fryer 38 to house is in an enclosed environment, or it might heat the tunnel 40 too high and starting pre-cooking the food product when that is not wanted. It is also believed that soon after the food product enters the fryer 38, the allergens will have been set and pose little risk then of being a source of air borne contamination.

Figure 2:
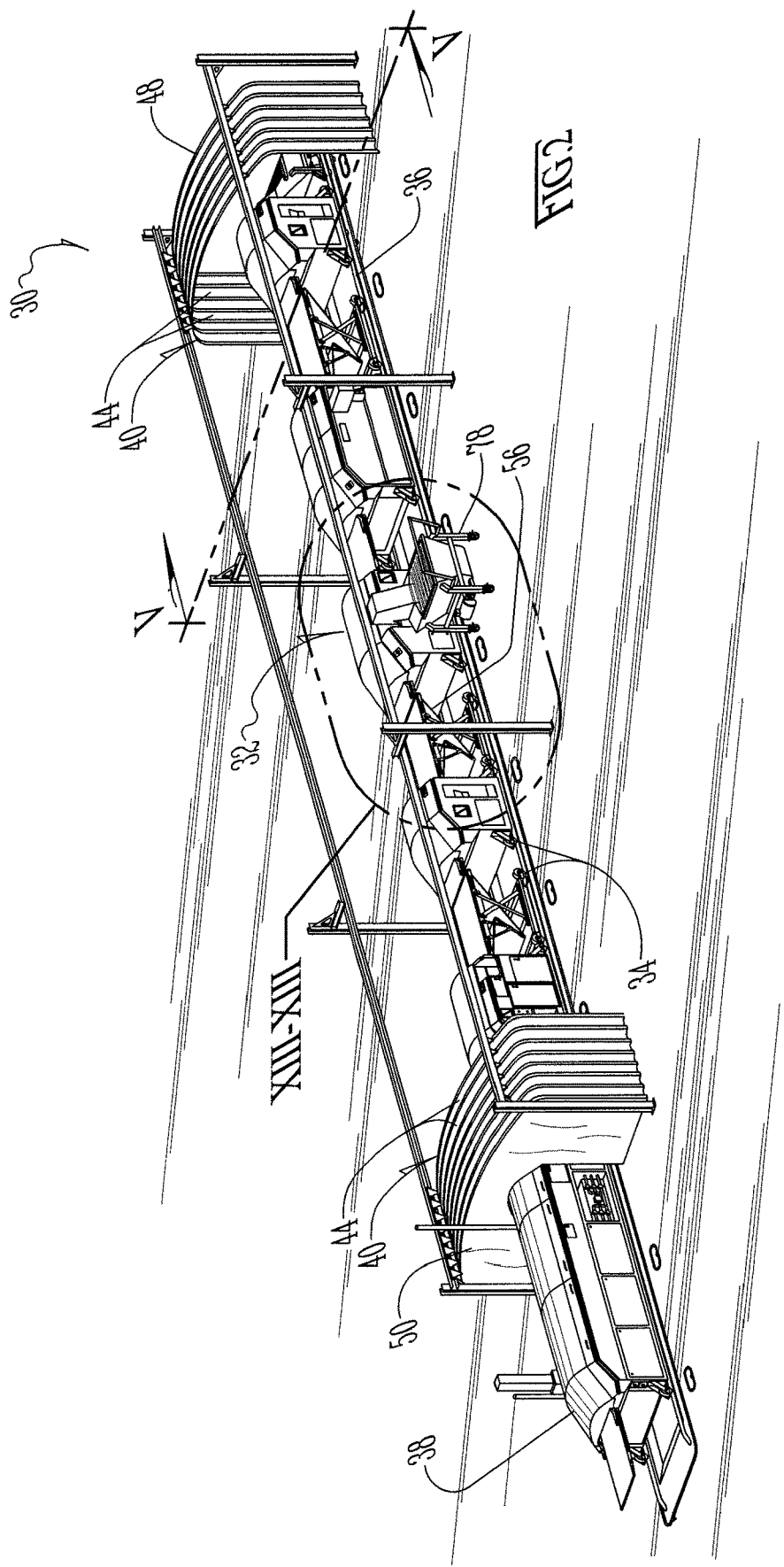
FIG. 2 is a perspective view comparable to FIG. 1 except showing that the tunnel-like enclosure comprises a construction of bellows-like soft materials like a transparent or semi-transparent polymeric material supported on spaced inverted-U shaped wickets, and which can be cycled between OPEN (retracted) and CLOSED (extended) states.

FIG. 2 shows that the tunnel 40 comprises a construction of bellows-like soft materials 44 like a transparent or semi-transparent polymeric material supported on spaced inverted-U shaped wickets. The tunnel 40 can be cycled between OPEN (retracted) and CLOSED (extended) states.

Figure 3:
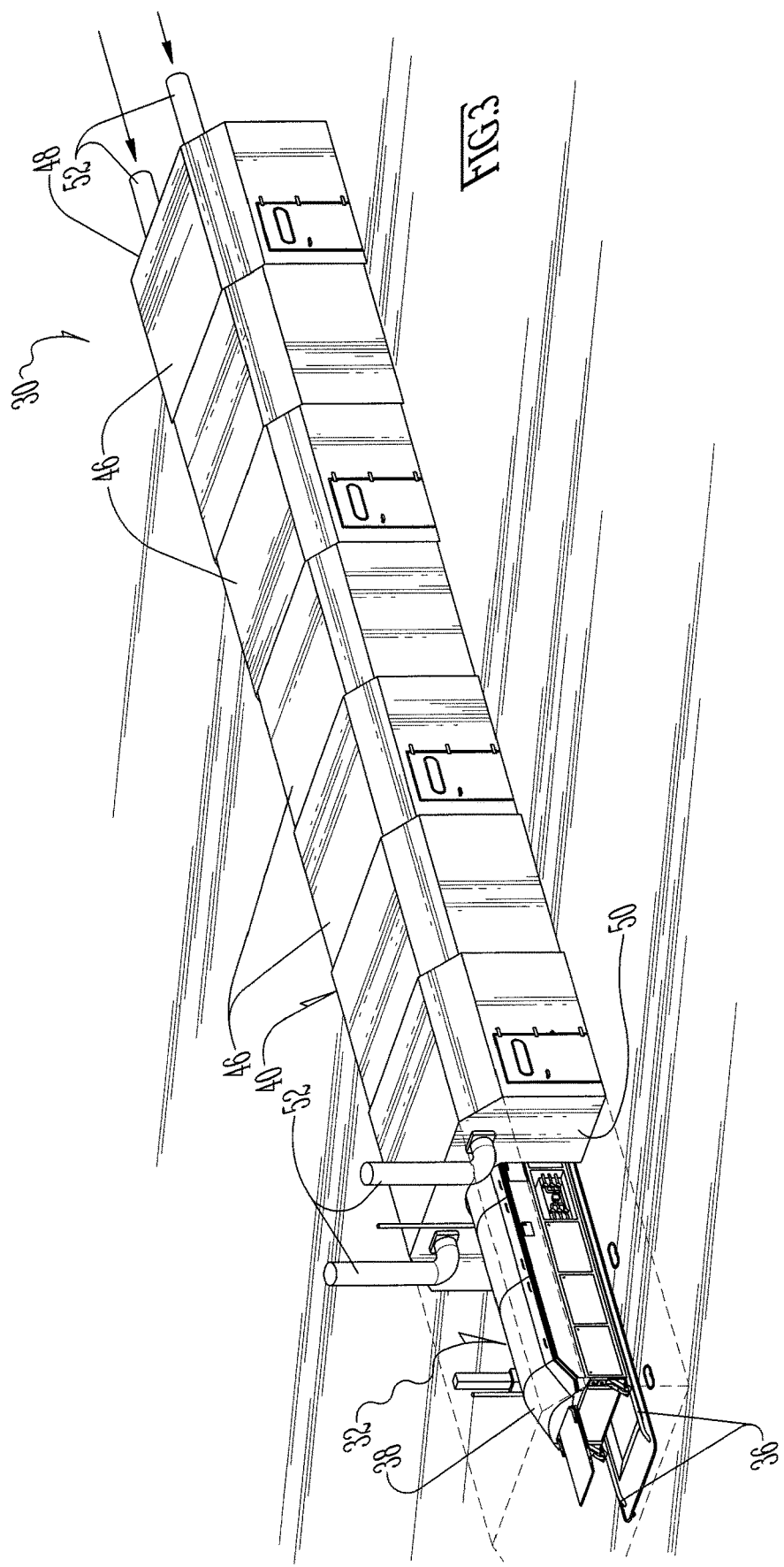
FIG. 3 is a perspective view comparable to FIG. 1 except showing the tunnel-like enclosure comprising a chain of telescoped car ports constructed of hard materials like stainless steel or the like, some or all of which are provided with access doors and/or windows.
Figure 4:
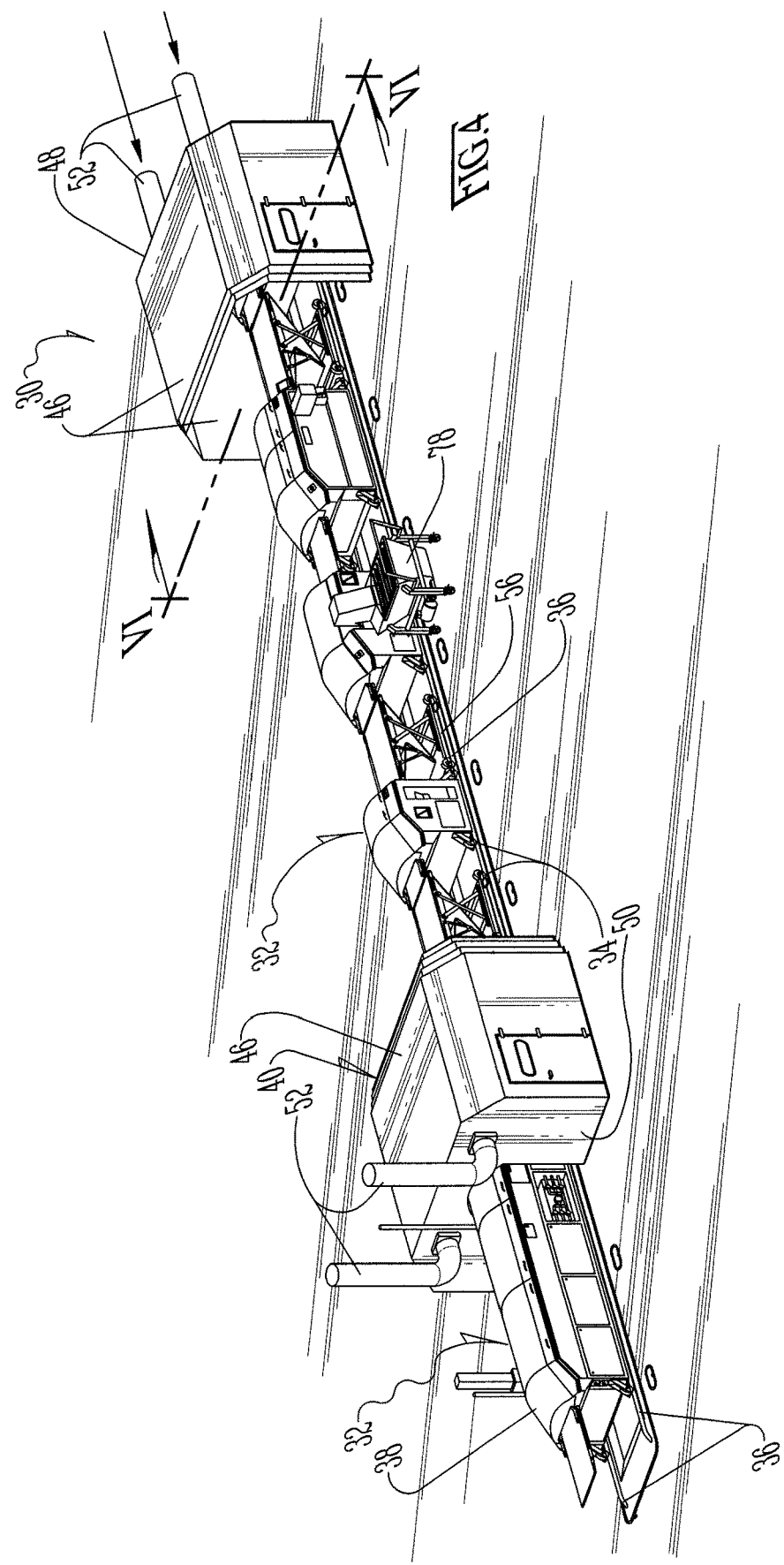
FIG. 4 is a perspective view comparable to FIG. 3 except showing that the tunnel-like enclosure comprising a chain of telescoped car ports constructed of hard materials can be cycled between OPEN (retracted) and CLOSED (extended) states.

FIGS. 3 and 4 shows the tunnel 40 comprising a chain of telescoped inverted-U shaped half-pipes 46 (eg., like car ports in the US) constructed of hard materials like stainless steel or the like. Some or all of which are provided with access doors and/or windows. FIG. 4 shows this tunnel 40 that comprises a chain of telescoped half pipes 46 of hard materials can also be cycled between OPEN (retracted) and CLOSED (extended) states.

The tunnel 40 is elongated between an upline end 48 and a downline end 50. FIGS. 1-4 show the fryer 38 protruding from the downline end. The tunnel 40 has a partial end wall on the downline end 50 to form a close-fitting opening for the fryer 38 to extend through.

Figure 5:
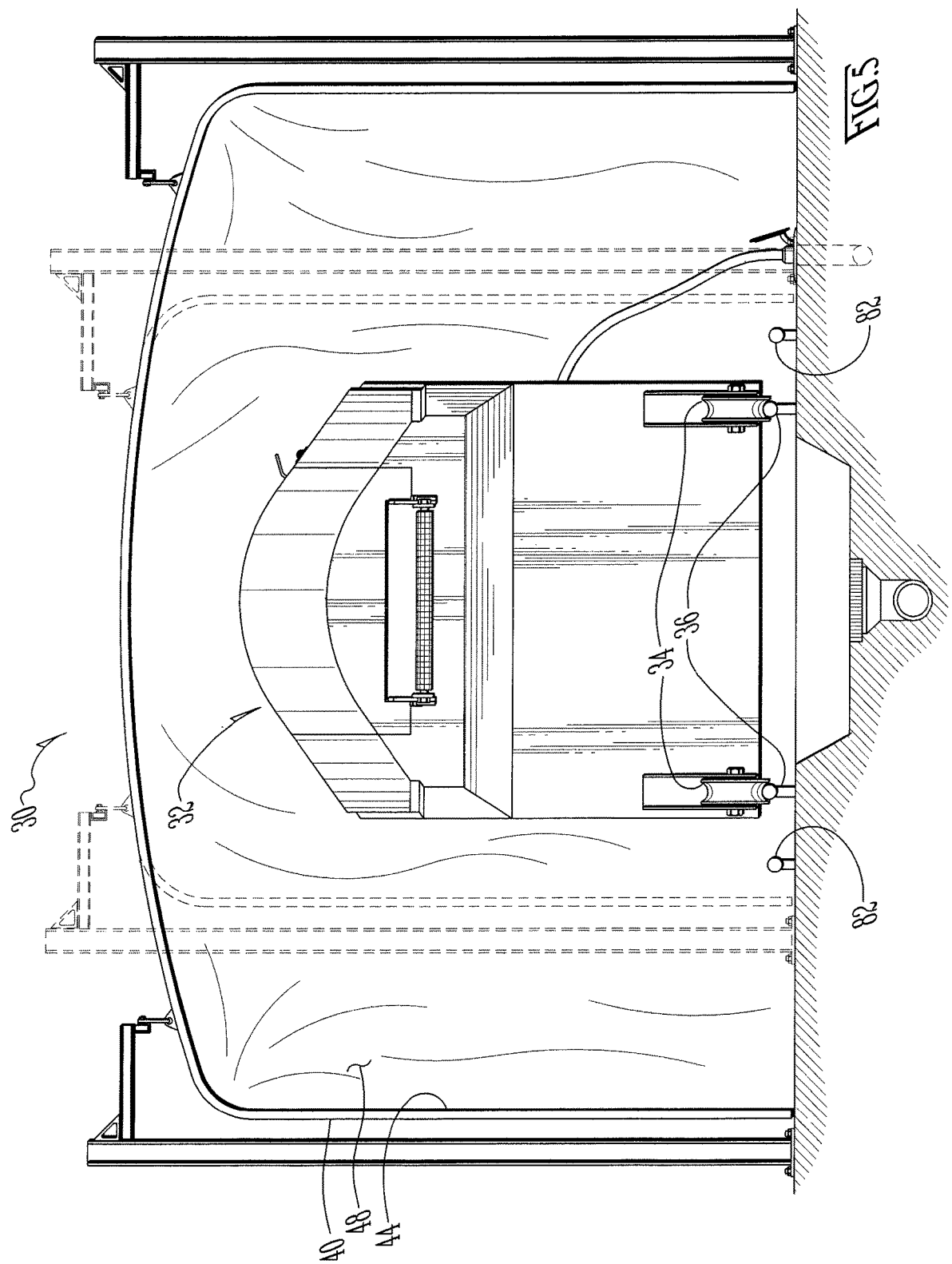
FIG. 5 is an elevational view, partly in section, taken in the direction of arrows V-V in FIGS. 2.

FIG. 5 shows the end wall of the upline end 48 of the tunnel 40. The end wall is provided with an elongated slit through which a thin conveyor extends, introducing pieces of food product to the food process line 30. Presumably, the food product pieces are raw pieces (uncooked). Raw pieces of chicken and most meats (excluding shellfish) are not thought to pose much of a risk of being a source for air borne allergens. Instead, the higher risk is with known ingredients or spices and the like in the coating materials. Indeed, a drum tumbler tumbling chicken pieces with dry particulate coating material is a pretty effective way to generate air borne particulate matter.

Figure 6:
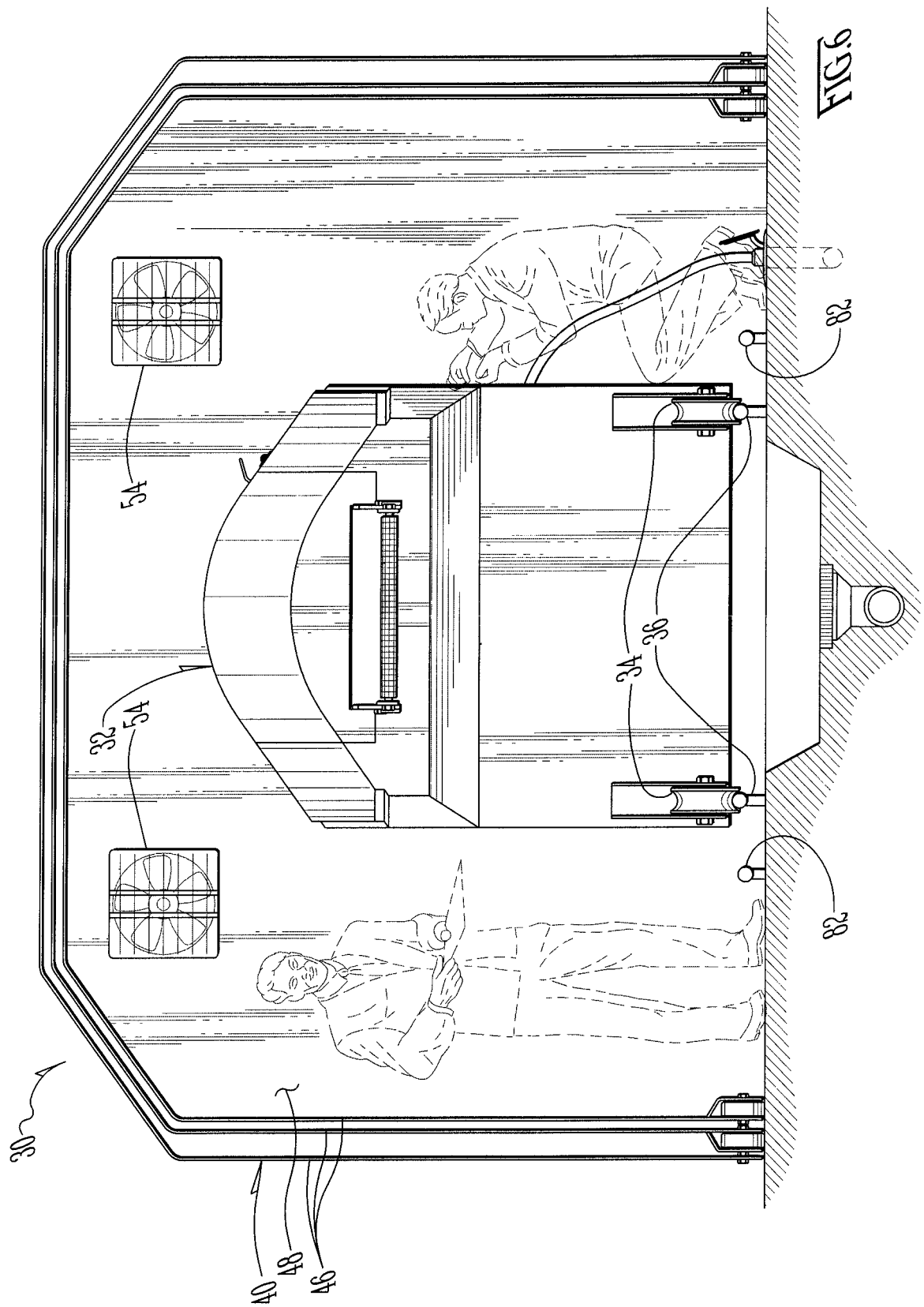
FIG. 6 is an elevational view, partly in section, taken in the direction of arrows VI-VI in FIG. 4.

FIGS. 3 and 6 show duct work 52 and fans 54 to produce a slight negative pressure in the tunnel 40. The exhaust stacks 52 would preferably to connect to outdoor vents outside of the food process plant. Additionally, the narrow slits which are the inlets for the introduction for food product would be preferably surrounded by air nozzles providing a constant curtain of air blowing into the tunnel 40 (and into the negative pressure). This would provide an additional measure of containing the air borne particulate matter inside the tunnel 40 from escaping into the food process plant.

Figure 7:
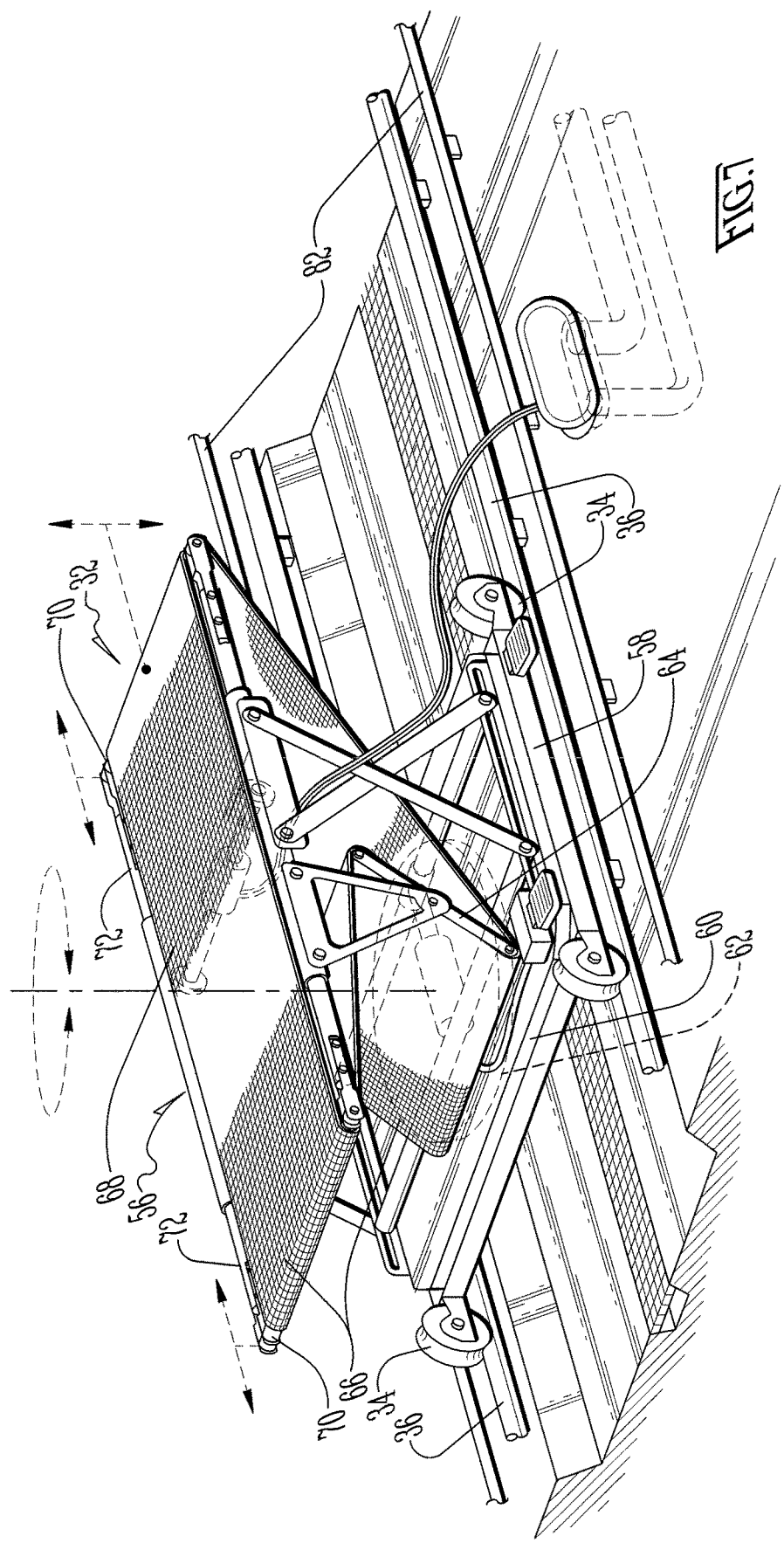
FIG. 7 is an enlarged-scale perspective view of one of the transfer conveyors of FIG. 2 or 4 showing that the respective nose rollers of the (upper) food-product carrying run of the wire mesh conveyor belt can extend and retract longitudinally so that the (upper) food product carrying run can expand or contract, whereby in the contracted state the turret portion of the transfer conveyor (and not the wheeled carriage) can pivot about a vertical axis for washing and/or maintenance operations.
Figure 8:
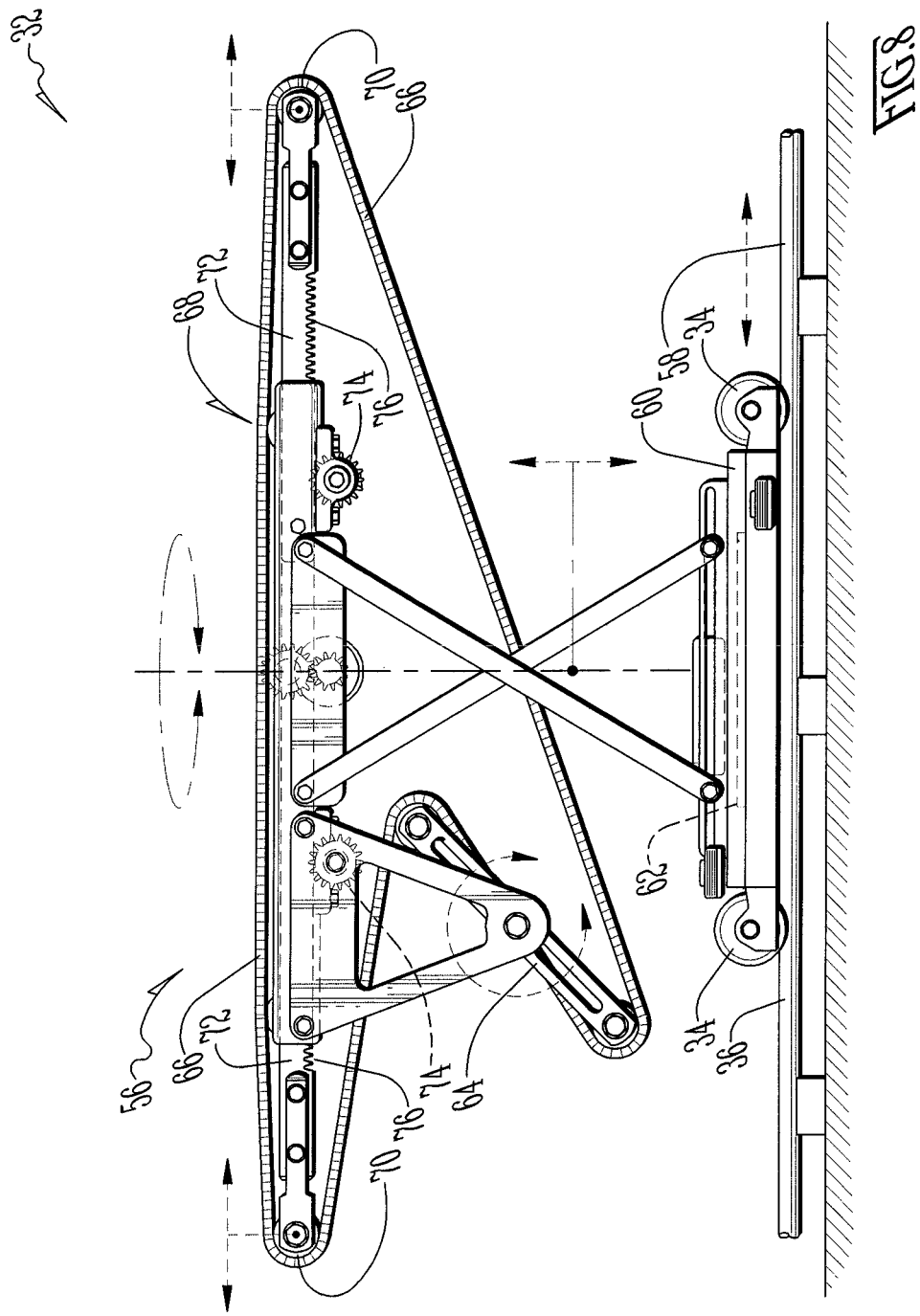
FIG. 8 is a side elevational view FIG. 7.

FIGS. 7 and 8 show a pivoting and reversibly expanding-contracting transfer conveyor 56 in accordance with the invention. There are several such transfer conveyors 56 shown in FIGS. 2 and 4.

A non-limiting example of a food process line 30 might comprise the following series of machines in a line. Let's assume that the food product is chicken tender pieces which are going to pre-dusted with spices and perhaps flour, dipped in batter and bread-coated twice, then fried. Hence the given food process line 30 might comprise the following series of machines:

a loader of (typically raw) food product;
a transfer conveyor (ie., the first);
a tumbling pre-dust coating machine;
a transfer conveyor (the second);
a batter coating machine;
a tumbling bread crumb coating machine;
a transfer conveyor (the third);
another batter coating machine;
another tumbling bread crumb coating machine;
a transfer conveyor (the fourth); and
a fryer (and likely a freezing and packaging process too).

It will be noticed in the above example that, the transfer conveyors follow dry coating processes, not wet ones (eg., the two batter coating machines). This keeps the transfer conveyor cleaner longer.

One aspect of operating food process lines 30 is that, since the output of the line is headed into the public food supply, the food process line 30 is subject to government inspectors (typically the USDA the US). If the food process line 30 is found to fail an inspection, all the food product outputted by that food product is subject to recall: or that is, all the food product outputted since the last washing of the food process line 30.

So if the food process line 30 is wash once a week, and failure is discovered at the end of the week, then a whole week's worth of output product has to be recalled.

If in contrast, the food process line 30 is washed nightly, then the worst case scenario is that any recall will be limited to one day's worth of output product.

Hence, in choosing how frequently to wash, there is a balance of equities such as follows:

run the food process line 30 for as long as practical to optimize run time vs. down time (ie., down time as for performing washing operations);

versus, wash frequently to reduce the risk of having a huge recall.

It is an object of the invention to provide improvements for decreasing the downtime for washing operations, thereby increasing the appeal of washing frequently.

Given the foregoing, the transfer conveyor 56 comprises a carriage 58, a turret 60 and pivot hardware 62 interconnecting the carriage 58 and turret 60. The carriage 58 is meant to be stationed as securely as possible in one fixed position in a food process line 30. The drawings show the carriage 58 riding on a rail by U-notched wheels or casters 34 which have locks to prevent rolling or any movement whatsoever, to the extent practical.

The turret 60 comprises spaced side panels spaced between a relatively solid bottom panel and a table plane which is characterized by parallel, longitudinally-elongated and laterally-spaced slide bars. There is a multiplicity of laterally extending rods, bars and/or axle shafts which extend between the spaced side panels, and give them rigidity. A subset of these comprise laterally extending course-changing means 64 for stretching an endless conveyor belt 66 in a circuit around such course-changing means. Example turning course-changing 64 means include without limitation rollers, pulleys or non-rotating nose bars and so on.

The endless conveyor belt 66 is preferably a wire mesh belt. Corresponding, the slide bars defining the table plane comprise low friction synthetic or polymeric materials.

The endless conveyor belt 66 courses a circuit comprising an (upper) food carrying run 68 and a (lower) return run.

FIG. 8 shows better that the belt 66 courses around four course-changing means 64 (eg., laterally-extending rollers). The upper food-product carrying run 68 of the belt 66 changes courses at opposite ends around respective nose rollers 70. The nose rollers 70 are held on movable brackets 72 which can be driven between extended and retracted by pinion gears 74 that mesh with respective rack gears 76 formed in the brackets 72. By movement of the brackets 72, this causes the transfer conveyor 56 to expand and contract between expanded and contracted extremes. Each bracket 72 also moves outward and inward in tandem with the respectively proximate nose roller 70.

Hence each traveling bracket 72 and its respective nose roller 70 move back and forth as a unit when the transfer conveyor 56 is in transition between a contracted state and an expanded state.

The transfer conveyor 56 set up in an expanded state for food process line 30 processing operations. In contrast, the transfer conveyor 56 is converted to a contracted state for maintenance and/or washing operations. The transfer conveyor 56 in a contracted state can be pivoted without moving the machines immediately upline and downline from it. Those queued flanking machines can be left in place. When washing or maintenance is finished, the transfer conveyor 56 can be pivoted back and expanded such that the food process line 30 is quickly put back to its careful alignment. The pivot hardware 62 includes an annular bearing race.

Figure 9:
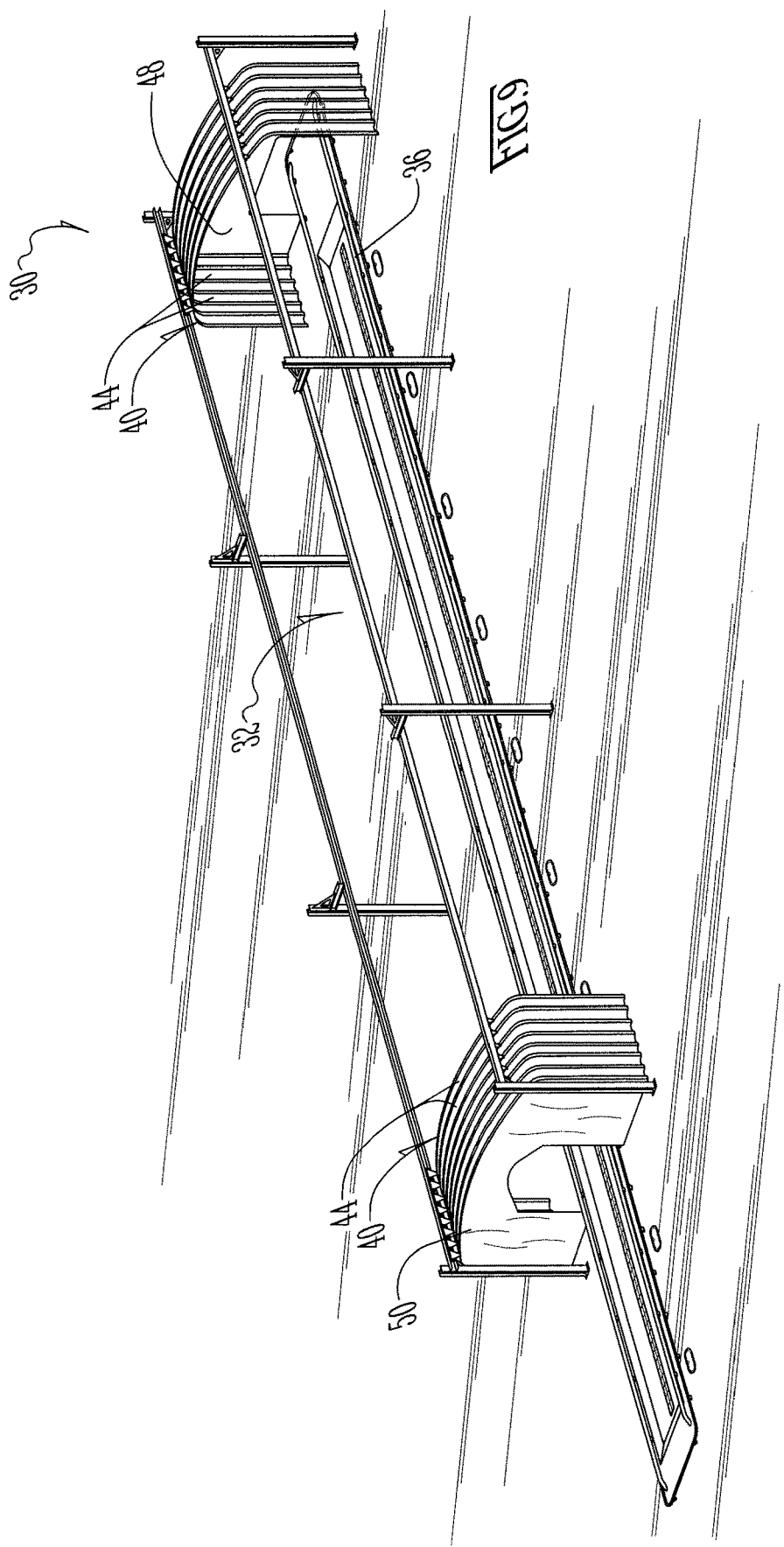
FIG. 9 is a perspective view comparable to FIG. 2 except showing that the assemblage of machines composing the of the food-process line assemblage in FIG. 2 have been removed from the view, as for perhaps re-building a different assemblage of machines for processing a different food product, or else a similar or same food product in a different fashion.
Figure 10:
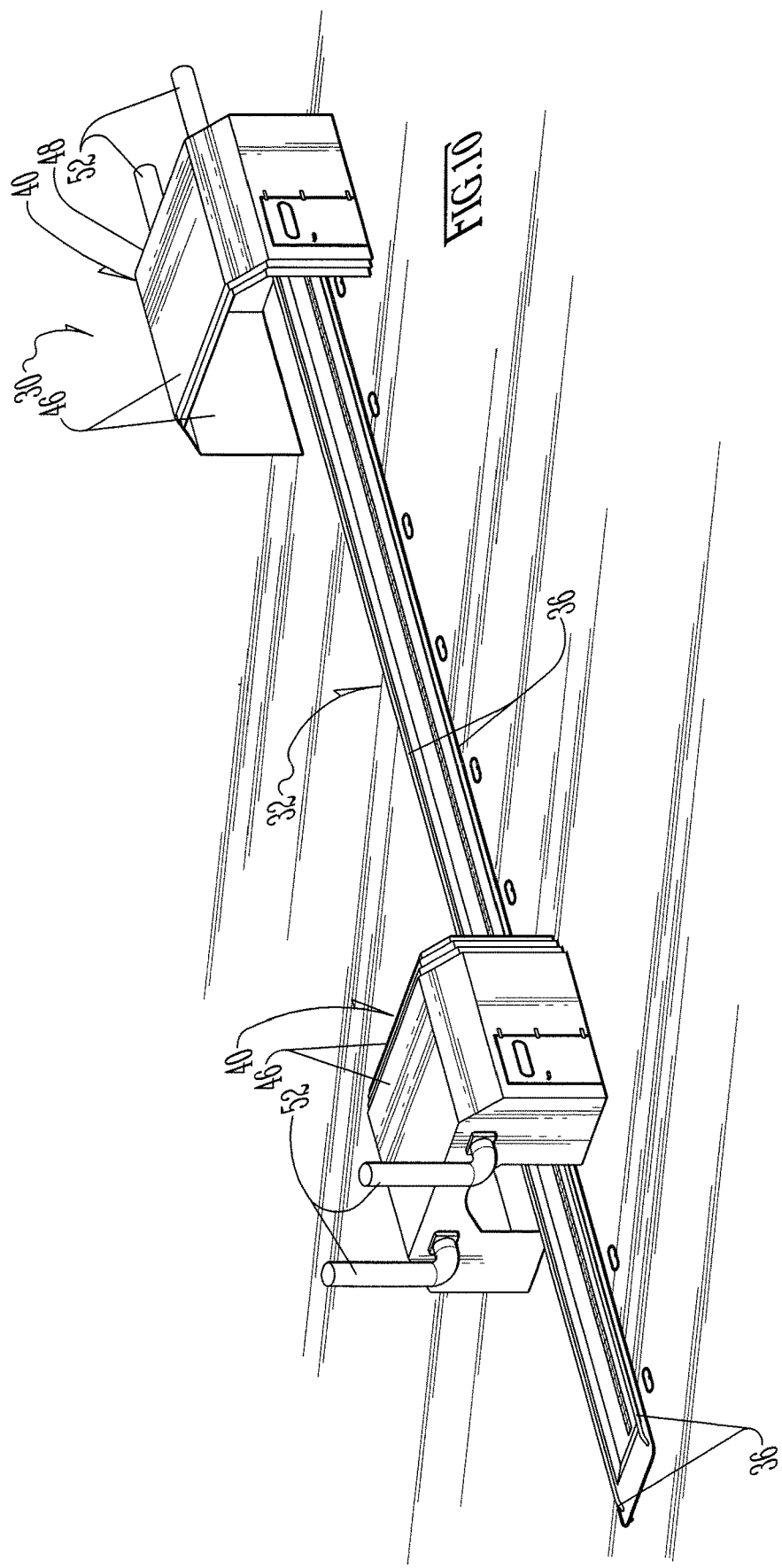
FIG. 10 is a perspective view comparable to FIG. 4 and again like FIG. 9 showing that the assemblage of machines composing the of the food-process line assemblage in FIG. 4 have been removed from the view, as for perhaps re-building a different assemblage of machines for processing a different food product, or else a similar or same food product in a different fashion.
Figure 11:
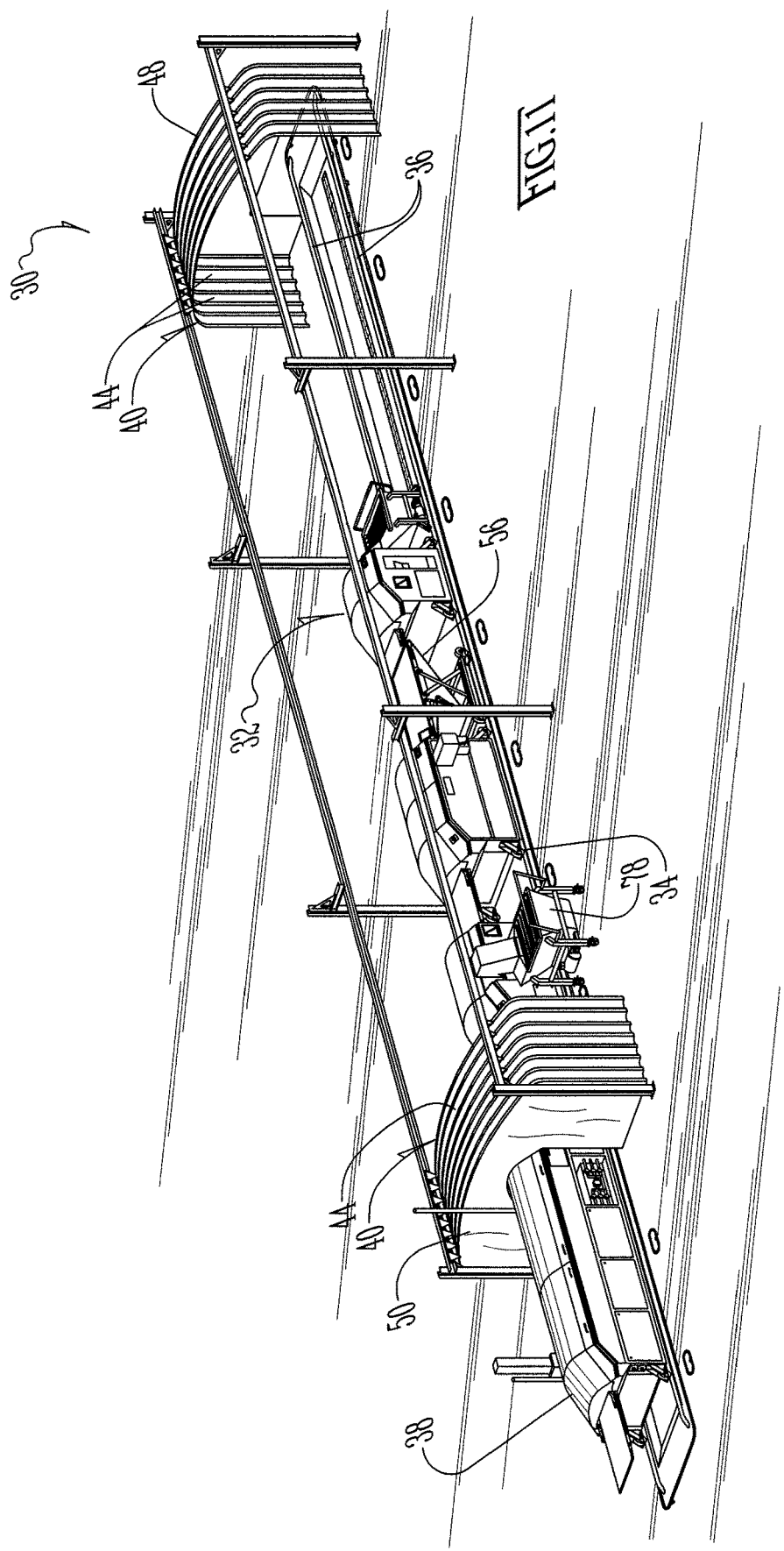
FIG. 11 is a perspective view comparable to FIG. 2 except showing a different assemblage of machines that will compose this food-process line.

FIGS. 9 and 10 correspond to FIGS. 2 and 4 respectively the assemblage 30 of food-process line machines have been removed from the view, as for perhaps re-building a different assemblage 30 of machines for processing a different food product, or else a similar or same food product in a different fashion. Indeed, FIG. 11 shows a food process line 30 except composed of a different assemblage 30 of machines.

Figure 13:
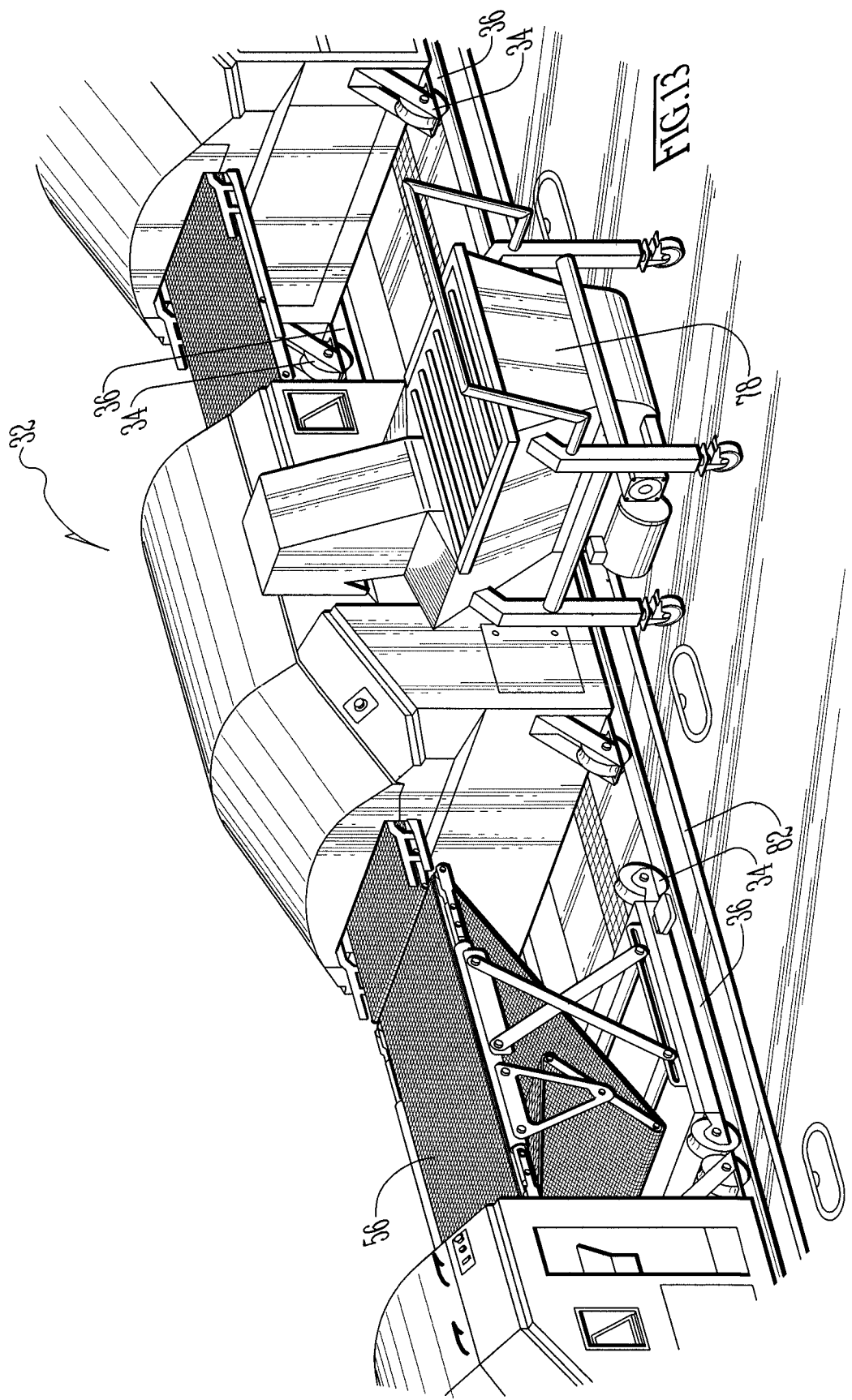
FIG. 13 is an enlarged-scale perspective view of detail XIII-XIII as indicated in both FIGS. 1 and 2, and showing a coating-material supply machine providing supply of coating material to a food-product coating machine.

FIG. 13 shows coating-material supply machine 78 providing a supply of coating material to a food-product coating machine 32. Preferably the supply machine 78 would likewise be located inside the tunnel 40.

FIG. 14 is a perspective view of the tunnel 40 of FIG. 5. The tunnel 40 has a variety of access doors allowing workers inside, as shown in FIG. 6.

FIGS. 15-18 are a series top plan block diagram views showing various assemblages of machines for food process lines 30 as well as showing various arrangements of feedback control systems 80 in accordance with the invention receiving inputs of product weight at one or more positions along the line and outputting control signals to one or more coating machines along the line to raise or lower the applied coating-material weight to the food product undergoing coating processes along the line.

Figure 19:
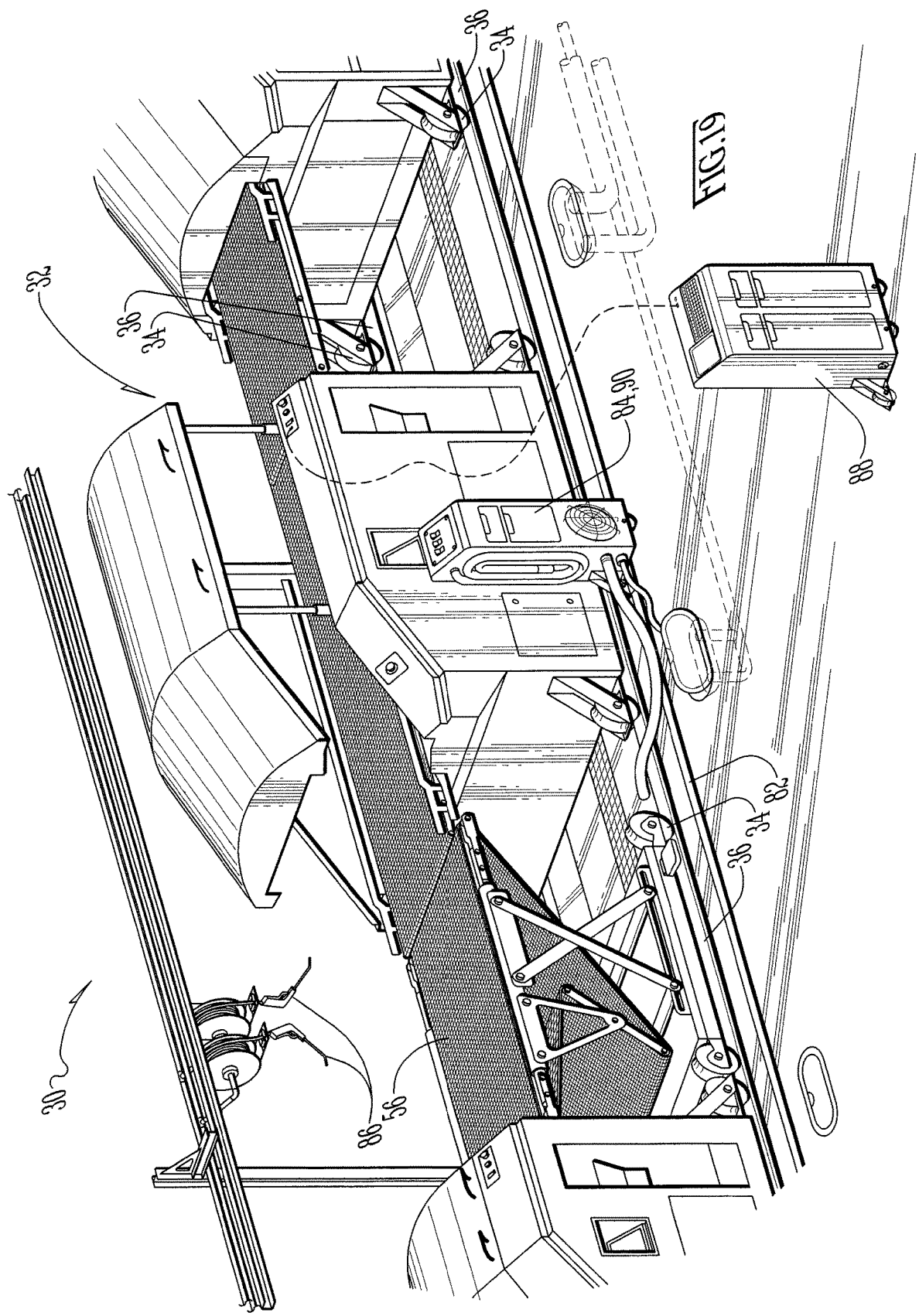
FIG. 19 is a perspective view comparable to FIG. 1 except showing the coating-material supply machine removed from view, the food-product coating machine deployed into an OPEN state for cleaning, one or more washing robots servicing the food-product coating machine, and which processes are under the automatic control of a controller, which sends various control instructions to the machines and robotic washers cooperatively, causing the machines to lift hoods and conveyors to better reveal for washing, and/or pivot to various angles so that the washing robot scan aim at the machine from various angles of attack.

FIG. 19 shows a food-product coating machine 32 deployed into an OPEN state for cleaning, and being attended by a floor-based washing robot 84 which rides on its own third track 82, with an overhead washing robot 86 idle at the moment. The washing processes under the automatic control of a controller 88, which sends various control instructions to the machines 32 and robotic washers 84,86 cooperatively, causing the machines 32 to lift hoods and conveyors 56 to better reveal themselves for washing, and/or pivot to various angles so that the washing robots 84,86 can aim at the machines 32 from various angles of attack.

It is an aspect of the invention to provide a maintenance robot 90 as counterpart to the floor-based washing robot 84. The maintenance robot 90 could traverse on the floor-based third track 82 and could remotely do any of the following service including without limitation:

check belt tension;
adjust belt tension;
change a belt;
change a roller;
change a bearing;
change a shaft;
change a shaft seal;
change a sprocket;
change a drive chain and/or other components of the drive system;

and so on without limitation.

Whereas it has been disclosed here that the machines 32, the floor-based washing 84 and maintenance robots 90 ride on floor-based tracks 36 or 82, and overhead tracks 82 for carrying robots 86 dangling from bridge cranes or the like, other mobile transit options are possible without limitation, like dynamic positioning (eg., how floating oil rigs position themselves), and so on and without limitation. That way, the parallel tracks 36 and perhaps even the turntables 62 can be dispensed with, and the machines 32 can drive themselves in 360° (degrees).

Another aspect of the invention is having a floor-based third track 82 running along the food process line 30. The third track 82 supports a floor-based traveling washing system 84. The robot 84 of the floor-based washing system runs on the track 82 alongside the food equipment to clean each machine 32 individually. Preferably this washing system 84 could operated while the tunnel 40 is CLOSED. Optionally, the combined ground-based and overhead washing systems 84 and 86 might do a rinse cycle while the tunnel 40 is CLOSED, then the tunnel 40 is OPENED so a final wash might be done with more robust equipment (like a miniature fire truck) or else be done manually.

Figure 20:
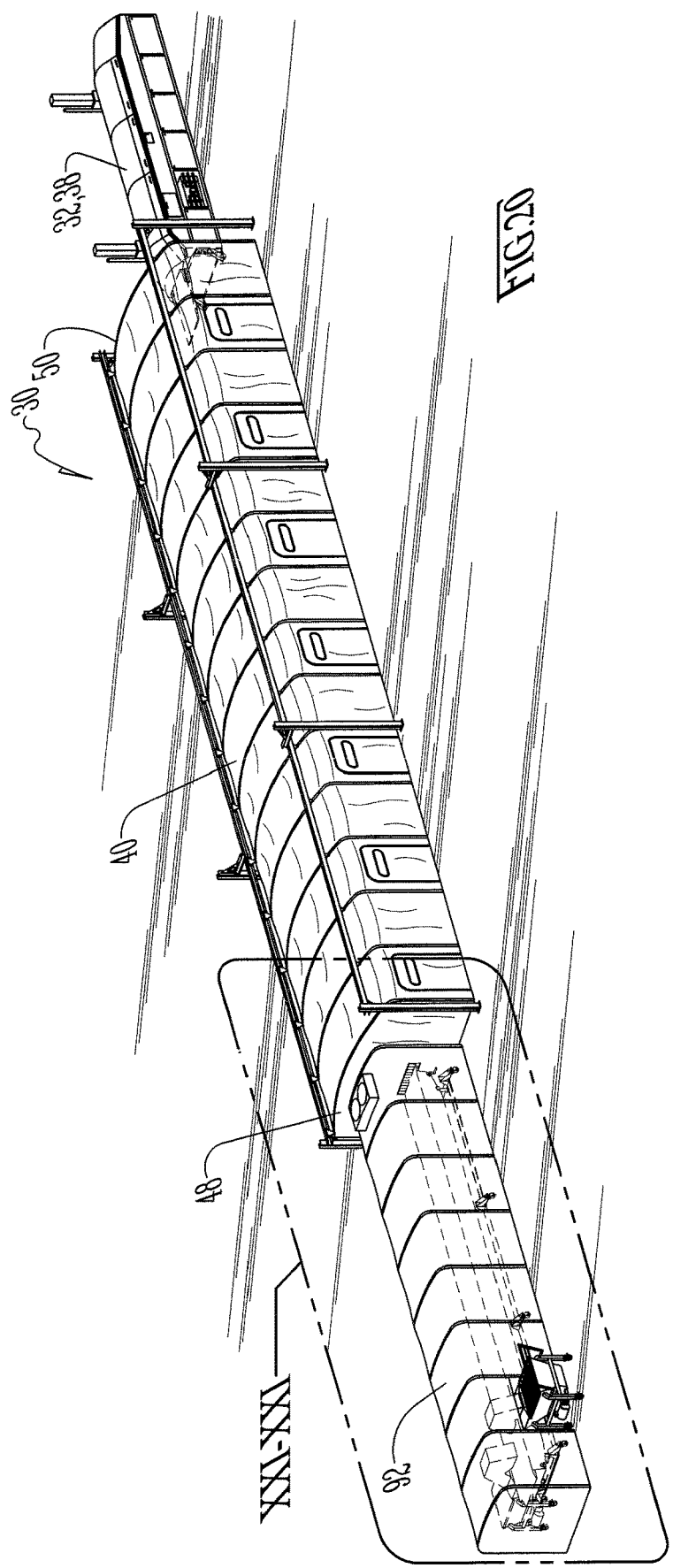
FIG. 20 is a perspective view comparable to FIG. 1 except showing the food-product loading operations at the beginning of the food process line housed in its own climate controlled room.

FIG. 20 is a perspective view comparable to FIG. 1 except showing the food-product loading operations at the beginning of the food process line 30 are housed in their own climate controlled room 92. FIG. 21 shows better the induction of a negative pressure in both the tunnel 40 and auxiliary room 92.

FIGS. 22 and 23 show that some portions of the sidewalls of the tunnel 40 may be equipped with isolation gloves 94.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A food process line, comprising:
   at least one transfer conveyor comprising an endless conveyor belt having an upper, food-product carrying run and a lower, return run, the upper, food-product carrying run extending between an intake end and a discharge end; and
   at least one food process line machine disposed relative the at least one transfer conveyor to discharge food product onto the intake end of the belt of the transfer conveyor; and
   at least one other food process line machine disposed relative to the at least one transfer conveyor to receive food product from the discharge end of the belt of the transfer conveyor;
   wherein the at least one transfer conveyor can pivot in place to thereby give access to all of said at least one transfer conveyor, said at least one food process line machine, and said at least one other food process line machine for at least one of washing and cleaning operations;
   said food process line further comprising an elongated tunnel that extends between a generally-closed downline end and a generally-closed upline end;
   wherein the at least one transfer conveyor and at least one food process line machine are housed in the elongated tunnel;
   wherein the generally-closed downline end and the generally-closed upline end isolate a climate in the tunnel whereby air borne allergens are substantially contained from escaping outside the tunnel; and
   wherein the at least one transfer conveyor comprises a base carriage and a turret pivotally mounted to the base carriage;
   said turret being mounted with course-changing hardware for supporting and tensioning the endless conveyor belt, said course-changing hardware including spaced nose rollers between which is defined the upper, food-product carrying run;
   said at least one transfer conveyor further comprises two pair of movable brackets, one pair of movable brackets for supporting one nose roller and the other pair of movable brackets for support the other nose roller;
   said movable brackets having extension and retraction strokes that correspondingly give the upper, food-product carrying run expanded and contracted states;
   said at least one transfer conveyor being scaled and configured such said at least one transfer conveyor can pivot in place between the at least one food process line machine and the at least one other food process line machine without moving either.

2. The food process line of claim 1, wherein:
   the at least one food process line machine housed within the tunnel comprises a food-product coating machine for coating with dry particulate.

3. A food process line, comprising:
   at least one transfer conveyor comprising an endless conveyor belt having an upper, food-product carrying run and a lower, return run, the upper, food-product carrying run extending between an intake end and a discharge end; and
   at least one food process line machine disposed relative the at least one transfer conveyor to discharge food product onto the intake end of the belt of the transfer conveyor; and
   at least one other food process line machine disposed relative to the at least one transfer conveyor to receive food product from the discharge end of the belt of the transfer conveyor;
   wherein the at least one transfer conveyor can pivot in place to thereby give access to all of said at least one transfer conveyor, said at least one food process line machine, and said at least one other food process line machine for at least one of washing and cleaning operations;
   said food process line further comprising an elongated tunnel that extends between a generally-closed downline end and a generally-closed upline end;
   wherein the at least one transfer conveyor and at least one food process line machine are housed in the elongated tunnel; and
   wherein the generally-closed downline end and the generally-closed upline end isolate a climate in the tunnel whereby air borne allergens are substantially contained from escaping outside the tunnel;
   wherein the at least one food process line machine housed within the tunnel comprises a food-product coating machine;
   said food process line further comprising one or more product weight sensors at one or more positions along the food process line;
   one or more regulators of coating material dispensing associated with a respective coating machine along the food process line; and
   a feedback control system receiving inputs of product weight at the one or more positions along the food process line and outputting control signals to the one or more regulators of coating material dispensing associated with the respective coating machine thereof along the food process line.

4. The food process line of claim 3, further comprising:
   a source of negative pressure connected to the tunnel by duct work or exhaust stacks, whereby the tunnel isolates the climate therein by negative pressure.

5. The food process line of claim 3, wherein:
   the tunnel is retractable to an open state and can be reversibly closed to a closed state, either by having sidewalls of soft materials or having sidewalls of rigid inverted-U half pipe sections, some which telescope under others.

6. The food process line of claim 3, wherein:
the at least one other food process line machine comprises a fryer disposed partly outside the downline end of the tunnel and is thereby generally situated outside of the tunnel.

7. A food process line, comprising:
at least one transfer conveyor comprising an endless conveyor belt having an upper, food-product carrying run and a lower, return run, the upper, food-product carrying run extending between an intake end and a discharge end; and
at least one food process line machine disposed relative the at least one transfer conveyor to discharge food product onto the intake end of the belt of the transfer conveyor; and
at least one other food process line machine disposed relative to the at least one transfer conveyor to receive food product from the discharge end of the belt of the transfer conveyor;
wherein the at least one transfer conveyor can pivot in place to thereby give access to all of said at least one transfer conveyor, said at least one food process line machine, and said at least one other food process line machine for at least one of washing and cleaning operations;
said food process line further comprising an elongated tunnel that extends between a generally-closed downline end and a generally-closed upline end;
wherein the at least one transfer conveyor and at least one food process line machine are housed in the elongated tunnel; and
wherein the generally-closed downline end and the generally-closed upline end isolate a climate in the tunnel whereby air borne allergens are substantially contained from escaping outside the tunnel;
said food process line further comprising maintenance robots disposed inside the tunnel for performing maintenance operations on food process line machines inside the tunnel; and
a laterally-spaced track parallel to the food process line; and
the maintenance robot comprising riding gear for traversing the track.

8. The food process line of claim 7, further comprising:
a washing system disposed inside the tunnel whereby washing operations to clean the food process line machines inside the tunnel can be performed inside the tunnel.

9. The food process line of claim 8, wherein:
said washing system comprises both floor-based and overhead components.

10. The food process line of claim 7, further comprising:
a pair of parallel rail tracks; and
rolling riding gear for carrying the at least one transfer conveyor and the at least one food process line machine, which rolling riding gear ride on the pair of parallel rail tracks whereby the at least one transfer conveyor and the at least one food process line machine can be rolled into cooperative position with one another or rolled apart as for re-building a different sequence of machines for a food process line with another purpose.

11. A food process line, comprising:
at least one transfer conveyor comprising an endless conveyor belt having an upper, food-product carrying run and a lower, return run, the upper, food-product carrying run extending between an intake end and a discharge end; and
at least one food process line machine disposed relative the at least one transfer conveyor to discharge food product onto the intake end of the belt of the transfer conveyor; and
at least one other food process line machine disposed relative to the at least one transfer conveyor to receive food product from the discharge end of the belt of the transfer conveyor;
wherein the at least one transfer conveyor can pivot in place to thereby give access to all of said at least one transfer conveyor, said at least one food process line machine, and said at least one other food process line machine for at least one of washing and cleaning operations;
said food process line further comprising an elongated tunnel that extends between a generally-closed downline end and a generally-closed upline end;
wherein the at least one transfer conveyor and at least one food process line machine are housed in the elongated tunnel; and
wherein the generally-closed downline end and the generally-closed upline end isolate a climate in the tunnel whereby air borne allergens are substantially contained from escaping outside the tunnel;
said food process line further comprising at least one pair of isolation gloves; and
wherein the tunnel has sidewalls which have at least one portion furnished with the at least one pair of isolation gloves whereby workers can do some manual operations inside the tunnel without having to degrade the climate inside the tunnel while closed.

12. The food process line of claim 11, further comprising:
an auxiliary room that can be closed shut and conjoined with the upline end of the tunnel whereby the loading operations of raw food product pieces can be manually conducted from within the auxiliary room.

13. A selected food process line machine for situating before immediately adjacent upline food process line apparatus and immediately downline food process line apparatus, said selected food process line machine comprising:
an endless conveyor belt having an upper, food-product carrying run and a lower, return run, the upper, food-product carrying run extending between one nose end defining either an intake end or a discharge end bridging to either the immediately adjacent upline food process line apparatus or the immediately adjacent downline food process line apparatus, and, a spaced away other nose end;
a turret comprising a body supporting a movably mounted assembly for holding out the one nose end relative to the body, and, a spaced away inboard mount for the other nose end;
wherein the movably mounted assembly is movable between a first position and a second position wherein the first position has the one nose end aligned such that the upper, food-product carrying run successfully bridging to the respectfully immediately adjacent food process line apparatus for food product transfer therebetween; and
further comprising a carriage with pivot hardware pivotally propping the turret above the carriage;
wherein the second position has the one end nose end aligned apart from the respectively immediately adjacent food process line apparatus such that the selected food process line machine can pivoted with free clearance of the one nose end and upper, food-product carrying run from the immediately adjacent food process line apparatus to thereby give better access to all of said selected food process line machine, said immediately upline food process line apparatus and said immediately downline food process line apparatus for at least of one washing and maintenance operations; and wherein said movably mounted assembly further comprising a pair of movable brackets for supporting the one nose end;

said movable brackets having extension and retraction strokes that correspondingly give the other nose end the first position and the second position.

14. The selected food process line machine of claim 13, wherein:

selected food process line machine comprises any of:
a loader of food product;
a coating machine for dry material;
a coating and tumbling machine for dry material; or
a coating machine for wet material.

15. The selected food process line machine of claim 13, wherein:

wherein the movably mounted assembly is movable such that the first position gives all or part of the upper, food product carrying run a level run relative a horizontal plane or runs with a positive tilt or a negative tilt whereby said selected food process line machine can bridge between food process line apparatus that operate on dissimilar conveyor planes.

* * * * *